(12) United States Patent
Selstad et al.

(10) Patent No.: US 10,330,023 B2
(45) Date of Patent: Jun. 25, 2019

(54) FUEL FLOW ESTIMATION AND CONTROL SYSTEM AND METHOD IN A GAS TURBINE ENGINE

(71) Applicant: UNITED TECHNOLOGIES CORPORATION, Farmington, CT (US)

(72) Inventors: Tyler J. Selstad, West Hartford, CT (US); Todd Haugsjaahabink, Springfield, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 579 days.

(21) Appl. No.: 14/626,631

(22) Filed: Feb. 19, 2015

(65) Prior Publication Data

US 2016/0245188 A1    Aug. 25, 2016

(51) Int. Cl.
| | |
|---|---|
| *F02C 9/32* | (2006.01) |
| *F02C 9/26* | (2006.01) |
| *G01F 1/34* | (2006.01) |
| *G01F 13/00* | (2006.01) |

(52) U.S. Cl.
CPC .............. *F02C 9/32* (2013.01); *F02C 9/263* (2013.01); *G01F 1/34* (2013.01); *G01F 13/00* (2013.01); *F05D 2220/32* (2013.01); *F05D 2260/821* (2013.01)

(58) Field of Classification Search
CPC .... F02C 9/28; F02C 9/32; F02C 7/232; F02C 7/236; F05D 2270/301; F05D 2270/3011; F05D 2270/3015; F05D 2270/31; F05D 2260/821
See application file for complete search history.

(56) References Cited

U.S. PATENT DOCUMENTS

| | | | |
|---|---|---|---|
| 2,917,067 A | 12/1959 | Pearl | |
| 5,274,996 A * | 1/1994 | Goff | F02C 7/262 60/39.281 |
| 5,715,674 A * | 2/1998 | Reuter | F02C 7/232 60/39.281 |
| 2004/0011052 A1 | 1/2004 | Clements | |
| 2005/0043905 A1 | 2/2005 | Vary | |

(Continued)

FOREIGN PATENT DOCUMENTS

EP    3059423 A1    8/2016

OTHER PUBLICATIONS

EP Application No. 16156373.9 Extended European Search Report dated Jul. 12, 2016, 6 pages.

(Continued)

*Primary Examiner* — Todd E Manahan
*Assistant Examiner* — Marcos O Diaz
(74) *Attorney, Agent, or Firm* — Cantor Colburn LLP

(57) ABSTRACT

A system and methods of estimating and controlling fuel flow in a gas turbine engine are disclosed. The system and methods include providing a metering valve and a pressure regulating valve. The system and methods further include determining a differential pressure error of the pressure regulating valve based on a metering valve inlet pressure, a discharge pressure, and a bypass fuel flow and determining a metering valve fuel flow based on a metering valve position and the differential pressure error.

6 Claims, 5 Drawing Sheets

(56) References Cited

U.S. PATENT DOCUMENTS

| | | |
|---|---|---|
| 2007/0175449 A1* | 8/2007 | Mahoney ............... F23K 5/147 123/454 |
| 2012/0073301 A1 | 3/2012 | Paradise |
| 2012/0167594 A1 | 7/2012 | Poisson et al. |
| 2012/0315152 A1 | 12/2012 | Baker |
| 2013/0276918 A1 | 10/2013 | Haugsjaahabink |
| 2014/0069102 A1 | 3/2014 | Satienpoch et al. |
| 2015/0152790 A1 | 6/2015 | Javelot et al. |
| 2016/0326967 A1 | 11/2016 | Yamamoto et al. |
| 2017/0138781 A1 | 5/2017 | Adibhatla |
| 2017/0292457 A1 | 10/2017 | Selstad |

OTHER PUBLICATIONS

Extended European Search Report for Application No. 17163778.8-1607, dated Aug. 24, 2017 (8 pp).
EPD Application No. 17193864.0 Extended EP Search Report dated Jun. 20, 2018, 8 pages.

\* cited by examiner

FUEL FLOW ESTIMATION AND CONTROL SYSTEM AND METHOD IN A GAS TURBINE ENGINE

TECHNICAL FIELD OF THE DISCLOSED EMBODIMENTS

The present disclosure is generally related to turbine engines, in particular to fuel flow estimation and control systems and methods of estimating and controlling fuel flow in a gas turbine engine.

BACKGROUND OF THE DISCLOSED EMBODIMENTS

Fuel systems for gas turbine engines often include a fuel source and one or more pumps to deliver pressurized fuel to the combustor section of the engine. The fuel system typically includes a metering valve downstream of a pump to measure and regulate fuel flow to the combustor section and a bypass fuel line to recirculate fuel from a location between the pump and the metering valve to a location upstream of the pump. A typical fuel system also includes a pressure regulating valve to maintain a fixed differential pressure across the metering valve by controlling the fuel flowing through the bypass fuel line.

A common method of determining fuel flow through the fuel system includes using the position of the metering valve, also referred to as the metering valve stroke, to determine an associated fuel flow by referencing known fuel flow rates for the particular metering valve position values. However, this method assumes that the differential pressure across the metering valve is accurate with an ideal pressure regulating valve.

A need exists in the art for a reliable and accurate system and method for estimating fuel flow in a gas turbine engine with reduced reliance on pressure regulating valve accuracy.

SUMMARY OF THE DISCLOSED EMBODIMENTS

In an embodiment, a method of estimating fuel flow in a gas turbine engine is including a metering valve in fluid communication with a bypass fuel line and a pressure regulating valve is disclosed, the method comprising determining a metering valve position, determining a bypass fuel flow, determining a metering valve inlet pressure, determining a discharge pressure upstream of the bypass fuel line, determining a differential pressure error of the pressure regulating valve based on the metering valve inlet pressure, the discharge pressure, and the bypass fuel flow, determining a metering valve fuel flow based on the metering valve position and the differential pressure error, and controlling the metering valve based on the metering valve fuel flow.

In a further embodiment of the above, determining the bypass fuel flow is based on an actuation system leakage fuel flow, a corrected metering valve fuel flow, and a pump fuel flow. In a further embodiment of any of the above, determining the metering valve inlet pressure is based on a pressure downstream of the metering valve and an ideal pressure regulating valve differential pressure. In a further embodiment of any of the above, the pressure downstream of the metering valve is based on a mass flow meter differential pressure, a minimum pressure shut off valve differential pressure, and a flow divider valve inlet pressure. In a further embodiment of any of the above, determining the differential pressure error is further based on an ideal pressure regulating valve differential pressure. In a further embodiment of any of the above, the method further comprises determining an uncorrected fuel flow based on the metering valve position and an ideal stroke-to-flow map, wherein determining the metering valve fuel flow is based on the uncorrected fuel flow and the differential pressure error. In a further embodiment of any of the above, the method further comprises determining a fuel density, wherein determining the metering valve fuel flow is further based on the fuel density. In a further embodiment of any of the above, determining the differential pressure error is based on a pressure regulating valve differential pressure map.

In another embodiment, a method of controlling fuel flow in a gas turbine engine is disclosed comprising receiving a requested fuel flow, determining a differential pressure error, determining a corrected fuel flow based on the requested fuel flow and the differential pressure error, determining a requested metering valve position based on the corrected fuel flow, and controlling a metering valve based on the requested metering valve position.

In a further embodiment of any of the above, determining the requested metering valve position is further based on an ideal flow-to-stroke map. In a further embodiment of any of the above, the method further comprises determining a density corrected fuel flow based on the requested fuel flow and a fuel density error. In a further embodiment of any of the above, the method further comprises correcting the requested metering valve position based on an uncorrected metering valve position and a position error value.

In another embodiment, a fuel flow estimation system in a gas turbine engine is disclosed comprising a metering valve, a pressure regulating valve configured to regulate pressure across the metering valve, a bypass fuel line in fluid communication with the pressure regulating valve, a discharge fuel line upstream of the bypass fuel line, and a controller configured to determine a differential pressure error of the pressure regulating valve based on a bypass fuel flow of the bypass fuel line, an inlet pressure of the metering valve, and a discharge pressure of the discharge fuel line, and determine a metering valve fuel flow based on the differential pressure error and a position of the metering valve.

In a further embodiment of any of the above, the system further comprises a fuel pump, a fuel nozzle, and an actuation system, wherein the bypass fuel flow is based on a fuel flow of the fuel pump, a corrected metering valve fuel flow, and an actuation system leakage fuel flow of the actuation system. In a further embodiment of any of the above, the metering valve inlet pressure is based on a pressure downstream of the metering valve and an ideal pressure regulating valve differential pressure. In a further embodiment of any of the above, the system further comprises a mass flow meter positioned downstream of the metering valve, a minimum pressure shut off valve positioned downstream of the metering valve, and a flow divider valve positioned downstream of the metering valve, wherein a pressure downstream of the metering valve is based on a differential pressure of the mass flow meter, a differential pressure of the minimum pressure shut off valve, and an inlet pressure of the flow divider valve. In a further embodiment of any of the above, the differential pressure error is based on an ideal pressure regulating valve differential pressure. In a further embodiment of any of the above, the controller is further configured to determine an uncorrected fuel flow based on the metering valve position and an ideal stroke-to-flow map, and determine the metering valve fuel flow based on the uncorrected fuel flow and the differential pressure error. In a further embodiment of any of the above, the controller is further configured to determine a fuel density, and determine the metering valve fuel flow based on the fuel density. In a further embodiment of any of the above, the differential pressure error is based on a pressure regulating valve differential pressure map.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
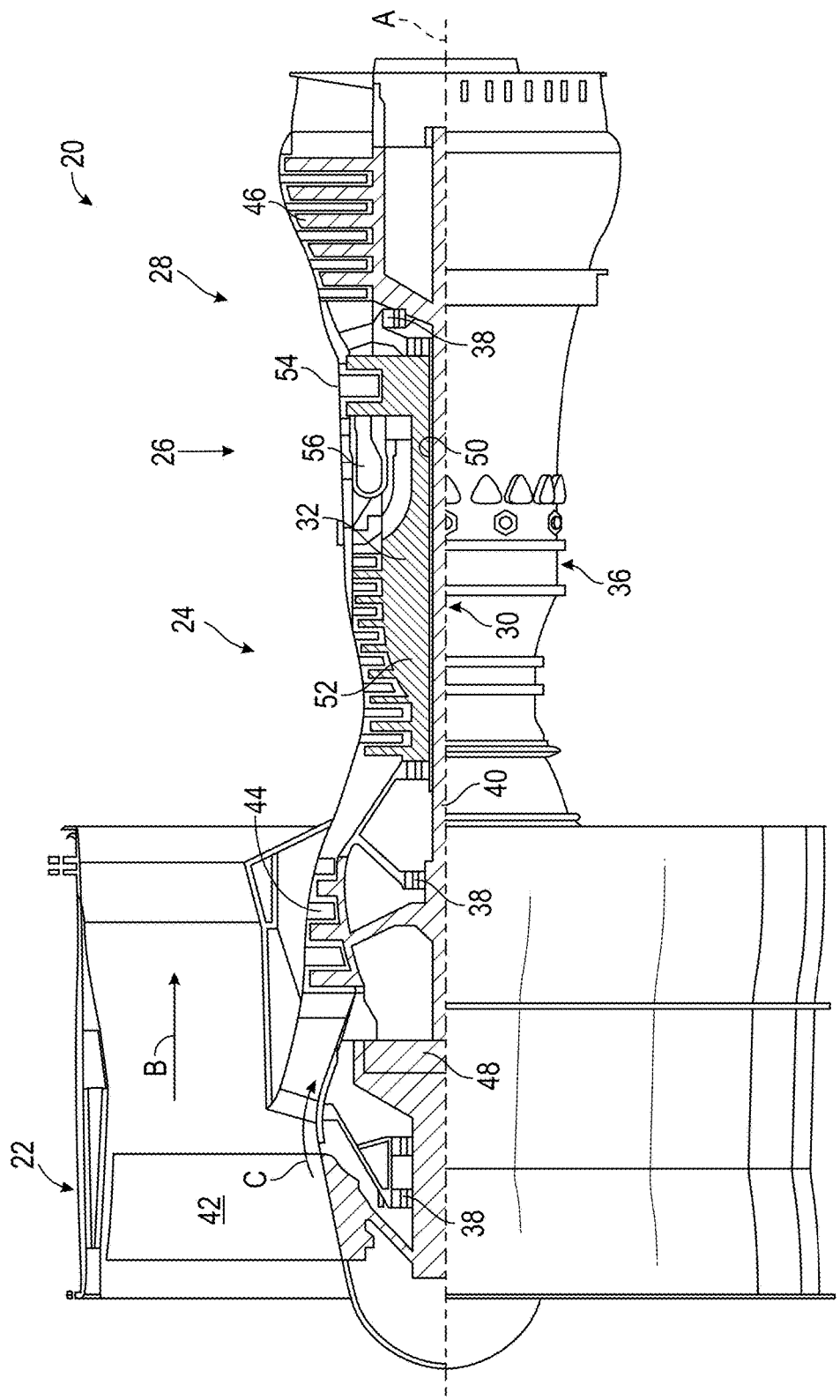
FIG. 1 is a sectional view of one example of a gas turbine engine in which the presently disclosed embodiments may be used.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ °\ R)/(518.7°\ R)]^{0.5}$. The "Low corrected fan tip speed" as disclosed herein according to one non-limiting embodiment is less than about 1150 ft/second (350.5 m/sec).

Figure 2:
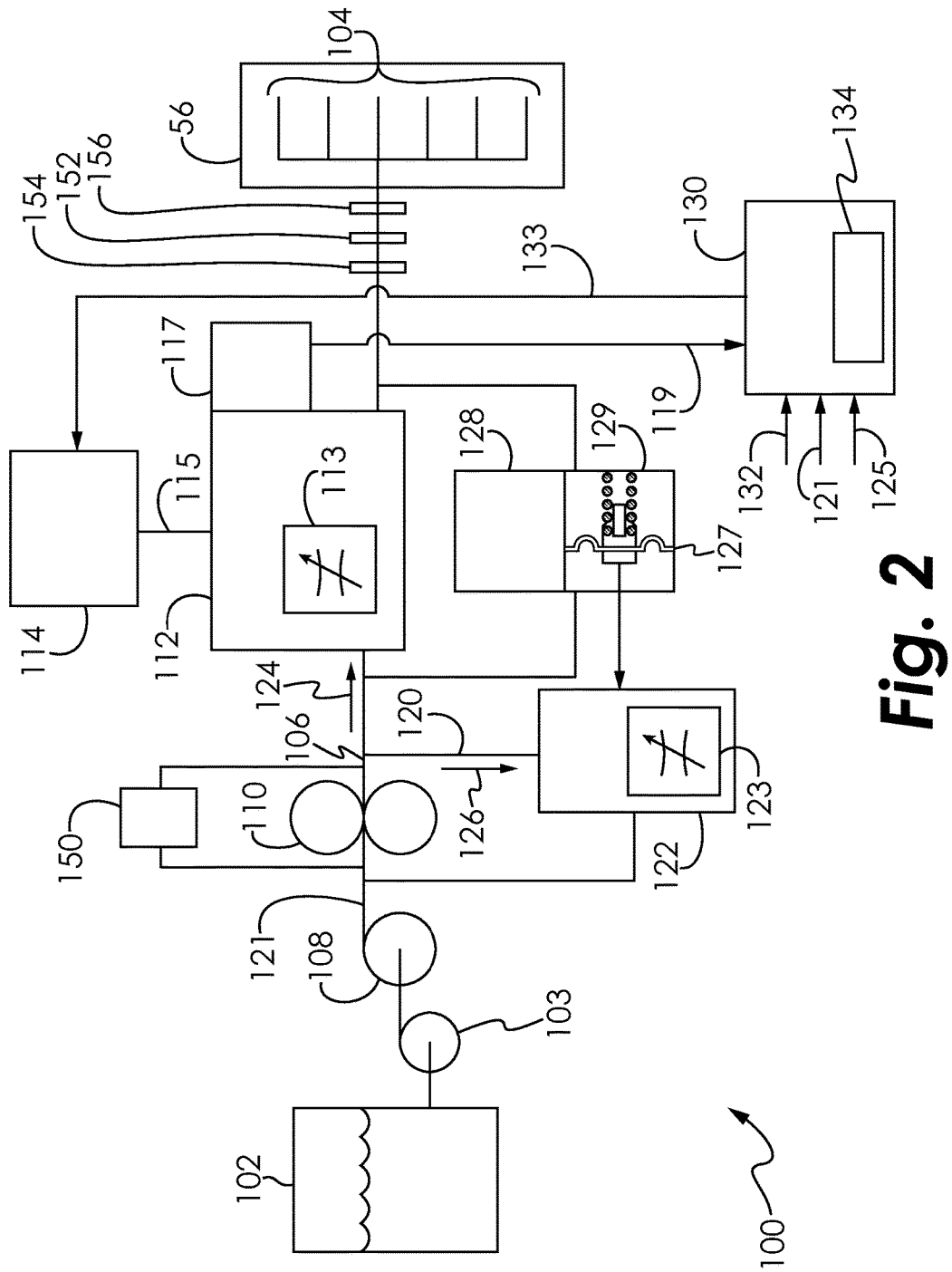
FIG. 2 is a fuel flow schematic for one example of a gas turbine engine in which the presently disclosed embodiments may be used.

Referring now to FIG. 2, a fuel control system 100 for a gas turbine engine in accordance with one embodiment is shown. The system 100 includes a fuel source 102, such as a fuel tank, that stores the fuel supplied to the combustor 56. Fuel is sent through an aircraft booster pump 103 before being sent through an engine booster pump 108. A fuel supply line 106 is coupled to the fuel source 102 and, via various components, delivers the fuel to the combustor 56 via a plurality of fuel nozzles 104. The engine booster pump 108, such as a relatively low horsepower centrifugal pump, and a high pressure fuel pump 110, such as a gear pump or other positive displacement pump, may be used in an embodiment. The pumps 103, 108, 110 are positioned in flow-series in the supply line 106 and draw fuel from the fuel source 102. The engine booster pump 108 provides sufficient suction head for the high pressure pump 110. The fuel pump 110 then supplies the fuel, at a relatively high pressure, such as approximately 1200 psig in one non-limiting example, to the remainder of the supply line 106.

In one or more embodiments, an actuation system 150 receives a flow of fuel from a downstream position of the pump 110 to supply fuel for accessory purposes, such as for providing flow and pressure to fueldraulic engine actuators. The fuel traveling from the actuation system 150 is then routed to a location upstream of the pump 110. As will be explained below, fuel leakage or loss may occur in the actuation system 150 for consideration in determining fuel flow in the fuel control system 100.

A metering valve 112 is positioned in flow-series in the supply line 106 downstream of the fuel pump 110. The metering valve 112 includes a first variable area flow orifice 113 through which a portion of the fuel in the supply line 106 flows. A metering valve control device 114 is used to adjust the position, also referred to as the stroke, of the metering valve 112, and thus the area of the first variable area flow orifice 113. In the embodiment of FIG. 2, the metering valve 112 is a hydraulically-operated valve and the metering valve control device 114 is an electro-hydraulic servo valve (EHSV) that supplies a metering valve control signal output 115. The control signal output 115 from the metering valve control device 114 is coupled to the metering valve 112 and is used to adjust the position of the metering valve 112 by controlling the flow of operational hydraulic fluid to the metering valve 112.

It will be appreciated that the metering valve 112 and control device 114 described above are only exemplary of a particular embodiment, and that each may be implemented using other types of devices. As one non-limiting example, the metering valve 112 may be an electrically operated valve. In this case, a control device 114, such as an EHSV, may not be used, or the control device 114 could be implemented as an independent controller. In any case, as will be described further below, a fuel flow rate to the combustor 56 is controlled by adjusting the position of the metering valve 112, and thus the area of the first variable area flow orifice 113, via the metering valve control device 114.

A metering valve position sensor 117 is coupled to the metering valve 112 and is used to sense the position of the metering valve 112 and supply a metering valve position signal 119. The position of the metering valve 112 is directly related to the area of the first variable area flow orifice 113, which is directly related to the fuel flow rate to the combustor 56, as described below. The position sensor 117 of one embodiment is a dual channel linear variable differential transformer (LVDT). Other embodiments of the position sensor 117 include any one of numerous position sensing devices known in the art. As a non-limiting example, the position sensor 117 may be a rotary variable differential transformer (RVDT).

A bypass fuel line 120 is connected to the supply line 106 between the fuel pump 110 and the metering valve 112. The bypass fuel line 120 bypasses a portion of the fuel in the supply line 106 back to the inlet of the fuel pump 110. It will be appreciated that the present disclosure is not limited to bypassing a portion of the fuel back to the inlet of the fuel pump 110, but also includes embodiments in which the fuel is bypassed back to the inlet of the booster pump 108, back to the fuel source 102, or back to any position upstream from the fuel pump 110. A discharge fuel line 121 is positioned upstream of the bypass fuel line 120.

In the embodiment of FIG. 2, a pressure regulating valve 122 is positioned in flow-series in the bypass fuel line 120, and includes a second variable area flow orifice 123 through which fuel in the bypass fuel line 120 flows. Thus, as indicated by the flow arrows in FIG. 2, a first fraction 124 of the fuel in the supply line 106 is directed through the metering valve 112, and a second fraction 126 is directed through the pressure regulating valve 122. In the embodiment of FIG. 2, the absolute (and relative) magnitudes of the first fraction 124 and second fraction 126 are controlled by adjusting the areas of the first 113 and the second 123 variable area flow orifices.

The position of the pressure regulating valve 122, and thus the area of the second variable area flow orifice 123, is adjusted under the control of a pressure differential sensor 128. The pressure differential sensor 128 is configured to sense the differential pressure (ΔP) between the inlet and outlet of the metering valve 112. The pressure differential sensor 128, which is coupled to the pressure regulating valve 122, adjusts the area of the second variable area flow orifice 123 based on the sensed ΔP. In particular, the pressure differential sensor 128, implementing proportional control, adjusts the area of the second variable area flow orifice 123 to maintain a substantially constant, predetermined ΔP across the metering valve 112. In one embodiment, the pressure regulating valve 122 and the pressure differential sensor 128 are combined as a single valve structure.

It will be appreciated that the pressure regulating valve 122 and the pressure differential sensor 128 may be any one of numerous types of valves or sensors known in the art. In one embodiment, the pressure differential sensor 128 and the pressure regulating valve 122 are integrally formed as a thermally-compensated, spring-loaded spool valve. In one embodiment, the pressure differential sensor 128 is coupled to the pressure regulating valve 122 and includes a diaphragm 127 across which the metering valve differential pressure is applied. A spring 129 disposed on one side of the diaphragm 127. The selection of the pressure regulating valve 122 or the pressure differential sensor 128 may be dependent on the fuel system 100 arrangement.

Additionally, one or more embodiments of the present disclosure includes a mass flow meter 152, minimum pressure shut off valve 154, and a flow divider valve 156 in flow-series downstream from the metering valve 112.

A controller 130, which may be implemented within a gas turbine engine controller, such as a Full Authority Digital Engine Controller (FADEC) or other electronic engine controller (EEC), controls the flow of fuel to the combustor 56. To do so, the controller 130 receives various input signals and controls the fuel flow rate to the combustor 56 accordingly. In particular, the controller 130 receives an input control signal 132 from, for example, throttle control equipment (not illustrated) in the cockpit, the position signal 119 from the position sensor 117, a compressor discharge pressure signal 121 representative of the discharge pressure from the compressor section 24 in the engine 20, and an ambient pressure signal 125 representative of ambient pressure around the system 100. The controller 130, in response to these signals, supplies a drive signal 133 to the metering valve control device 114. In response to the drive signal 133, the metering valve control device 114, as was described above, adjusts the area of the first variable area flow orifice 113 to obtain the desired flow rate to the combustor 56. Memory 134 of the controller 130 stores values, algorithms, maps, and other reference data for calculation and/or retrieval by the controller 130 and other components of the system 100. One of ordinary skill will recognize that, in one or more embodiments of the present disclosure, common software control and evaluation operations such as calculating, receiving, sending, referencing, and determining are steps conducted by the controller 130 with or without using data stored in the memory 134.

Figure 3:
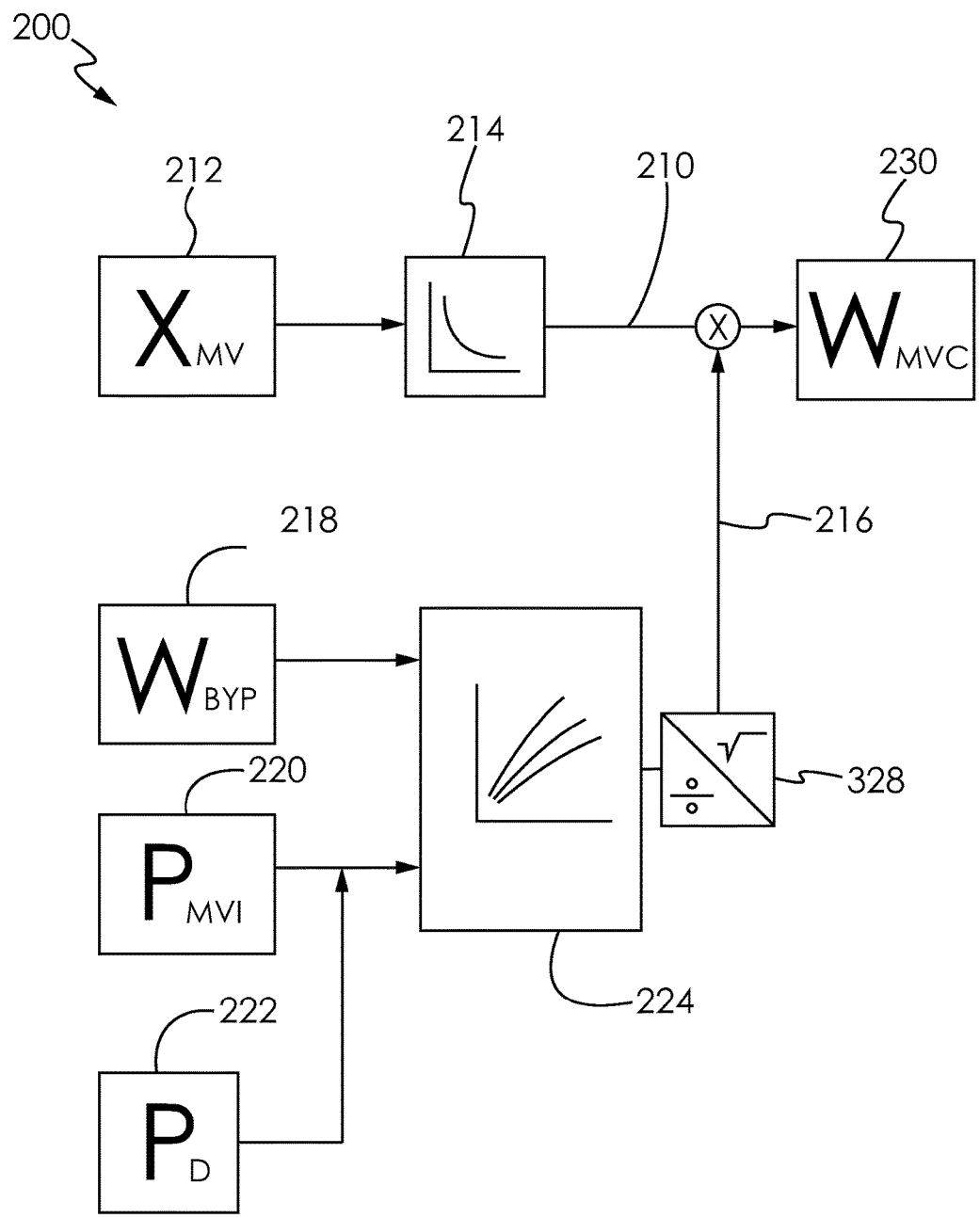
FIG. 3 is a schematic flow diagram of a fuel flow estimation method used in a gas turbine engine in one embodiment.

Referring now to FIG. 3, a fuel flow estimation method 200 is generally illustrated. Uncorrected fuel flow 210 across the metering valve 112 is determined by applying a position 212 of the metering valve to a stroke-to-flow map 214 stored in a memory 134 of the controller 130. As stated previously, the pressure regulating valve 122 functions to maintain a constant ΔP across the metering valve 112. However, the pressure regulating valve 122 may be non-ideal and perform with inaccuracies, such as pressure differential sensing or flow regulation inaccuracies, for the design of the system 100. In such cases, the position sensor 117 may not produce a fuel flow with reliable accuracy. As such, when the uncorrected fuel flow 210 is determined by the stroke-to-flow map 214, the uncorrected fuel flow 210 may contain error as a result of a non-ideal pressure regulating valve 122.

The fuel flow estimation method 200 utilizes the controller 130 for determining a differential pressure error 216 for the pressure regulating valve 122. The differential pressure error 216 of one embodiment is based on a bypass fuel flow 218, a metering valve inlet pressure 220, and a discharge pressure 222. The bypass fuel flow 218 is the flow of fuel in the bypass fuel line 120. The metering valve inlet pressure 220 is the fuel pressure directly upstream of the metering valve 112. The discharge pressure 222 is the fuel pressure directly upstream of the bypass fuel line 120 and downstream from the booster pump 108. The discharge pressure 222 is subtracted from the metering valve inlet pressure 220, and the resulting pressure value is combined with the bypass fuel flow 218 in a pressure regulating valve differential pressure map 224 to determine the differential pressure error 216. The method 200 of one embodiment includes the output of the map 224 being divided by an ideal pressure regulating valve differential pressure 328, the square root of which becomes the differential pressure error 216. The fuel flow estimation system 200 further includes the controller 130 determining a corrected fuel flow 230, or metering valve fuel flow, by multiplying the differential pressure error 216 to the uncorrected fuel flow 210, which is determined by the metering valve position 212.

Figure 4:
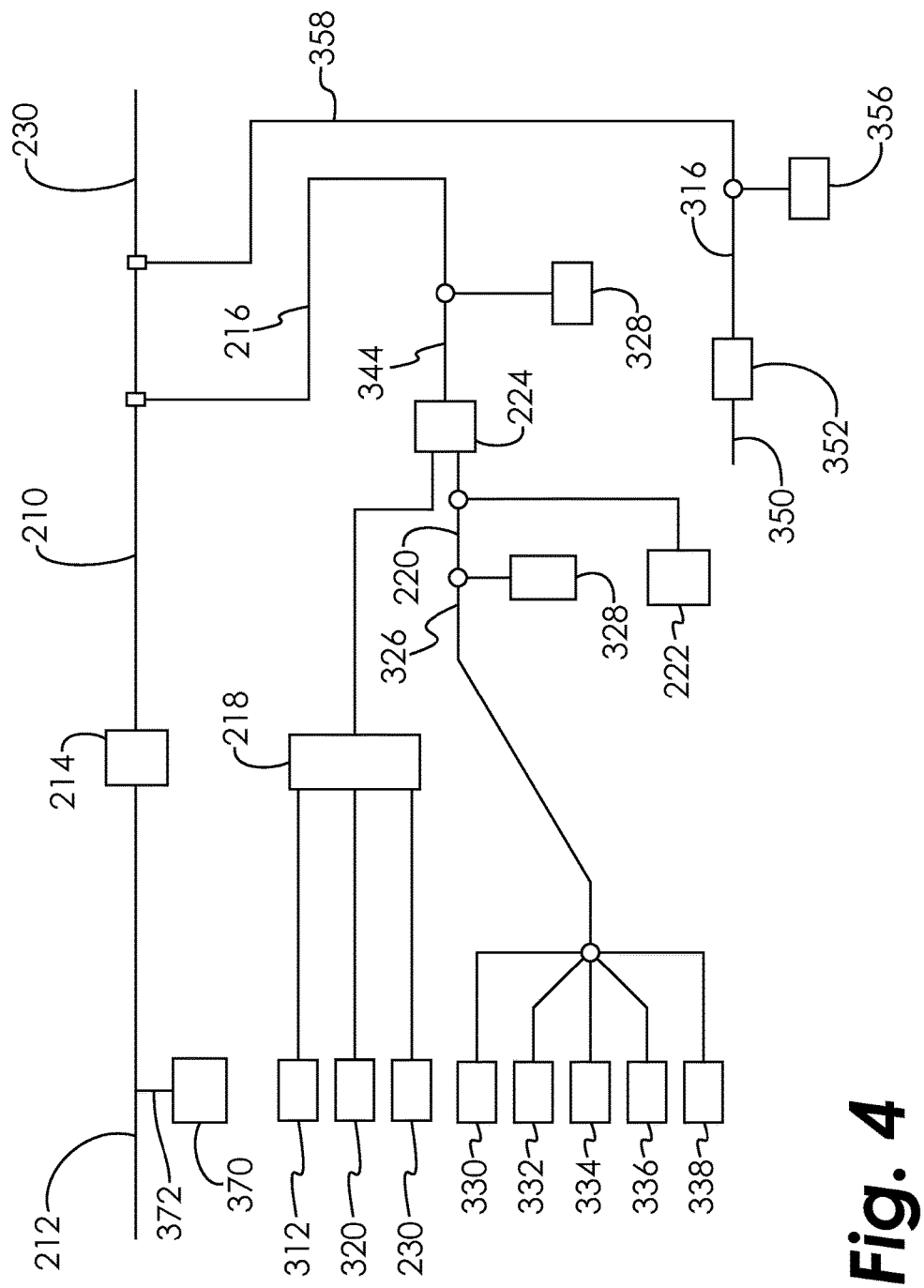
FIG. 4 is a schematic flow diagram of a fuel flow estimation method used in a gas turbine engine in one embodiment.

Referring now to FIG. 4, one or more embodiments of the fuel flow estimation method 200 are depicted. The metering valve position 212 of one or more embodiments is determined by correction based on temperature and reference values and/or maps. In one embodiment, the metering valve position 212 is corrected based on a position sensor thermal growth map 370 that determines a position error value 372 to compensate for thermal growth in the position sensor 117. The bypass fuel flow 218 of an embodiment includes a calculation of fuel pump fuel flow 312. As stated previously, the actuation system 150 experiences an amount of fuel consumption, loss, or leakage. The bypass fuel flow 218 is based on the fuel pump fuel flow 312, the corrected fuel flow 230, and an actuation system leakage fuel flow 320 of the actuation system 150.

In the embodiment shown in FIG. 4, to determine the metering valve inlet pressure 220, a pressure 326 downstream from the metering valve 112 is added to an ideal pressure regulating valve differential pressure 328. The pressure 326 is determined by adding a mass flow meter differential pressure 330, a minimum pressure shut off valve differential pressure 332, a flow divider valve inlet pressure 334, a burner pressure 336 at the combustor 56, and a nozzle differential pressure 338. The ideal pressure regulating valve differential pressure 328, mass flow meter differential pressure 330, minimum pressure shut off valve differential pressure 332, flow divider valve inlet pressure 334, and nozzle differential pressure 338 are a function of the corrected fuel flow 230.

The discharge pressure 222 is subtracted from the metering valve inlet pressure 220, and the resulting pressure value is combined with the bypass fuel flow 218 as inputs to a pressure regulating valve differential pressure map 224 to determine an uncorrected pressure regulating valve differential pressure 344 as a first step toward determining the differential pressure error 216 to be multiplied with the uncorrected fuel flow 210.

One or more embodiments of the present disclosure include determining a fuel density error 358 based on the metering valve fuel density 316 to further correct the uncorrected fuel flow 210. A fuel temperature 350 is applied to a fuel density reference curve 352 to produce a metering valve fuel density value 316. The metering valve fuel density 316 is then divided by a reference metering valve fuel density 356. The square root of the resulting value becomes the fuel density error 358.

Figure 5:
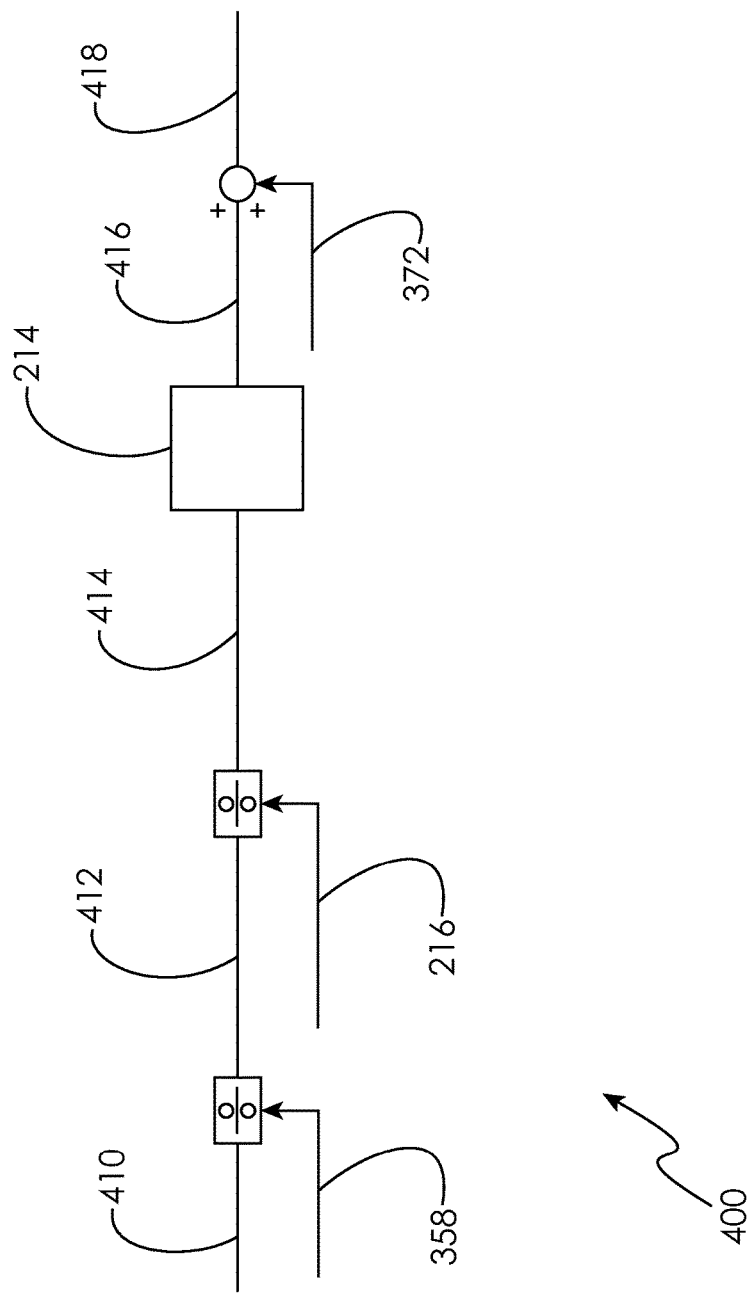
FIG. 5 is a schematic flow diagram of a fuel flow control method used in a gas turbine engine in one embodiment.

Referring now to FIG. 5, a fuel flow control method 400 is illustrated. As previously described and illustrated in FIG. 2, the controller 130, in response to input signals, supplies a drive signal 133 to the metering valve control device 114. In response to the drive signal 133, the metering valve control device 114 adjusts the area of the first variable area flow orifice 113 to obtain the desired flow rate to the combustor 56. The fuel flow control method 400 shown in the embodiment of FIG. 5 includes a requested fuel flow 410 that is initially divided by the fuel density error 358 to produce a density corrected fuel flow value 412. The density corrected fuel flow value 412 is then divided by the differential pressure error 216 to determine a differential pressure corrected fuel flow value 414, which is applied to an ideal flow-to-stroke map 420 to determine an uncorrected metering valve position 416. In an embodiment, the uncorrected metering valve position 416 is added to the position error value 372 to determine a requested metering valve position 418. The requested metering valve position 418 is sent as the drive signal 133 to the metering valve control device 114.

The various embodiments described for the fuel flow estimation and control system 100 and methods 300, 400 disclosed in the previous embodiments correct for a non-ideal pressure regulating valve 122. However, the disclosed system 100 and methods 300, 400 may be used with an ideal pressure regulating valve 122 to estimate and control fuel flow. The system 100 and methods 300, 400 evaluate and/or apply precise droops of the pressure regulating valve 122 or other hydro-mechanical hardware components while considering the effects of bypass flow, system pressures, thermal elongation, and density adjustments. However, as one of ordinary skill will recognize, other adjustments, corrections, or considerations may form part of the system 100 or methods 300, 400 as operations to estimate or control fuel flow.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method of estimating fuel flow through a gas turbine engine fuel supply circuit, the fuel supply circuit including a metering valve a first fuel loop disposed upstream of the metering valve, the first fuel loop being a bypass fuel line that includes a pressure regulating valve, the method comprising:
    determining a metering valve position from a metering valve position sensor;
    determining a thermally corrected metering valve position by applying the metering valve position to a first set of reference data stored in memory, the first set of reference data being thermal growth data for the metering valve position sensor;
    determining an uncorrected fuel flow across the metering valve by applying the thermally corrected metering valve position to a second set of data reference stored in memory, the second set of reference data being stroke-to-flow data for the metering valve;
    determining the flow through the bypass fuel line based in part on leakage fuel flow in a second fuel loop upstream of the metering valve, the second fuel loop being an actuation system that comprises fueldraulic engine actuators;
    determining a metering valve inlet pressure based on pressure downstream of the metering valve;
    determining a discharge pressure upstream of the bypass fuel line;
    determining a differential pressure error of the pressure regulating valve by applying the metering valve inlet pressure, the discharge pressure and flow through the bypass fuel line to a third set of reference data stored in memory, the third set of reference data being pressure regulating valve differential pressure data for the pressure regulating valve;
    determining a corrected metering valve fuel flow based on the uncorrected fuel flow and the differential pressure error; and
    controlling the metering valve based on the corrected metering valve fuel flow.

2. The method of claim 1, wherein determining the fuel flow through the bypass fuel line is further based on a pump fuel flow.

3. The method of claim 1, wherein determining the metering valve inlet pressure is further based on an ideal pressure regulating valve differential pressure.

4. The method of claim 3, wherein the pressure downstream of the metering valve is based on a mass flow meter differential pressure, a minimum pressure shut off valve differential pressure, and a flow divider valve inlet pressure.

5. The method of claim 1, wherein determining the differential pressure error is further based on an ideal pressure regulating valve differential pressure.

6. The method of claim 1, further comprising determining a fuel density, wherein determining the corrected metering valve fuel flow is further based on the fuel density.

\* \* \* \* \*